(12) United States Patent
Okamoto (10) Patent No.: US 8,434,517 B2
(45) Date of Patent: May 7, 2013

(54) CONTROL VALVE

(75) Inventor: Eiji Okamoto, Tokyo (JP)

(73) Assignee: Eagle Industry Co. Ltd., Tokyo (JP)

( * ) Notice: Subject to any disclaimer, the term of this patent is extended or adjusted under 35 U.S.C. 154(b) by 614 days.

(21) Appl. No.: 12/673,993

(22) PCT Filed: Aug. 22, 2008

(86) PCT No.: PCT/JP2008/065034
§ 371 (c)(1),
(2), (4) Date: Feb. 18, 2010

(87) PCT Pub. No.: WO2009/025366
PCT Pub. Date: Feb. 26, 2009

(65) Prior Publication Data
US 2011/0061749 A1    Mar. 17, 2011

(30) Foreign Application Priority Data
Aug. 23, 2007   (JP) ................................. 2007-216970

(51) Int. Cl.
*F16K 11/07* (2006.01)

(52) U.S. Cl.
USPC ............... 137/625.68; 137/596.2; 137/596.17

(58) Field of Classification Search ............ 137/596.17, 137/596.1, 596.2, 625.65, 625.69, 627.5, 137/625.68; 303/119.2
See application file for complete search history.

(56) References Cited

U.S. PATENT DOCUMENTS

| | | | |
|---|---|---|---|
| 4,442,998 A | 4/1984 | Ohyama et al. | |
| 5,234,265 A * | 8/1993 | Tyler ........................... | 303/119.2 |
| 5,771,933 A | 6/1998 | Akamatsu et al. | |
| 6,935,374 B2 * | 8/2005 | Yamamoto ................. | 137/627.5 |
| 7,159,615 B2 * | 1/2007 | Yamamoto ............... | 137/596.17 |
| 2004/0118463 A1 | 6/2004 | Yamamoto | |
| 2005/0076959 A1 | 4/2005 | Yamamoto | |

FOREIGN PATENT DOCUMENTS

| | | |
|---|---|---|
| JP | 56019371 A | 2/1981 |
| JP | 64036777-1989 | 3/1989 |
| JP | 02072881-1990 | 6/1990 |
| JP | 09222180 A | 8/1997 |
| JP | 2004197858 A | 7/2004 |
| WO | 2004072524 A1 | 8/2004 |

OTHER PUBLICATIONS

International Search Report.

* cited by examiner

*Primary Examiner* — Craig Schneider
*Assistant Examiner* — Craig Price
(74) *Attorney, Agent, or Firm* — Harness, Dickey & Pierce, PLC (57) ABSTRACT

The present invention relates to a control valve capable of performing capacity control independent of the pressure of operation fluid. In the control valve which opens and closes a first poppet valve and a second poppet valve by a solenoid section the following pressure-receiving areas relating to the first poppet valve and the second poppet valve are set to be substantially equal to each other: the first effective pressure-receiving area of a first pressure-sensing spring device, the second effective pressure-receiving area of a second pressure-sensing spring device, the first pressure-receiving area on the inner side of a portion where a first valve seat surface and a first valve section surface are in contact with each other, and the second pressure-receiving area on the inner side of a portion where a second valve seat surface and a second valve section surface are in contact with each other.

3 Claims, 9 Drawing Sheets

CONTROL VALVE

TECHNICAL FIELD

The present invention relates to a control valve used for capacity control of a fluid, e.g. capacity control of power transmission device, etc. Particularly, the present invention relates to a control valve, in which ineffective control due to unbalanced fluid pressure acting on a valve body or malfunction associated with sliding resistance at operation of the control valve, or delay in spring means, etc., due to fast moving of the valve body are improved for capacity control.

BACKGROUND ART

Figure 8:
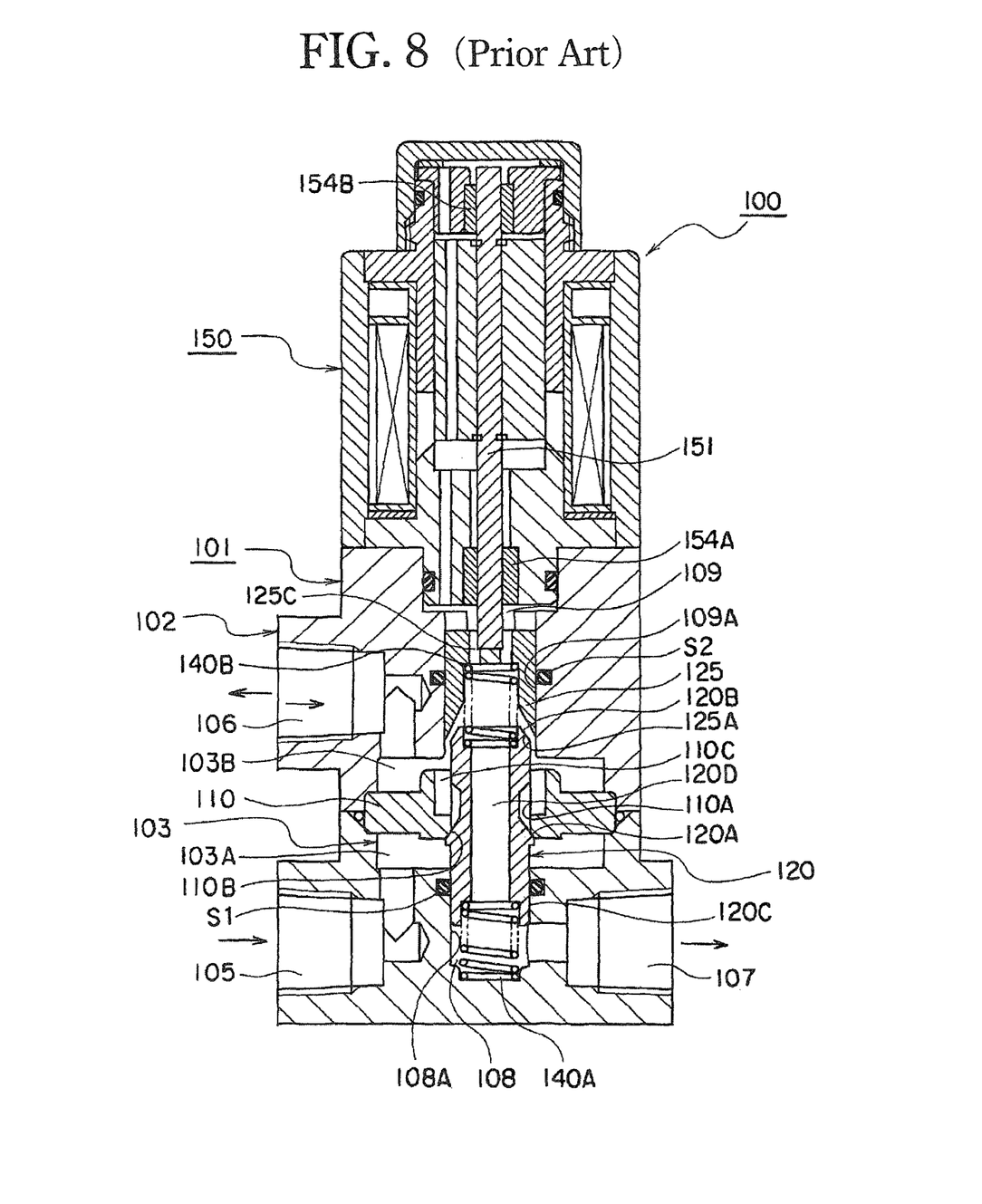
FIG. 8 is a full sectional view of a control valve of a prior art of the present invention.

As a related art of the present invention, a control valve is known. This control valve is a constitution as shown in FIG. 8 (e.g. Japanese Unexamined Patent Publication No. 2004-197858 (Patent Document 1)). This pressure control valve is a three-way valve used for, for example, pressure control of a switching clutch provided in a line of control system, etc., in an automatic transmission, pressure control of a switching brake, and pressure control of a line.

The constitution of this prior pressure control valve will be explained. In FIG. 8, a pressure control valve 100 is constituted by a valve main body 101 and a solenoid 150. A main body 102 forming a framework of the valve main body 101 is internally formed with a communication chamber 103. The communication chamber 103 is formed with an input port 105, an output port 106 and a discharge port 107, which communicate with the outside. Also, the communication chamber 103 is divided into a first communication chamber 103A which communicates with the input port 105 and a second communication chamber 103B which communicates with the output port 106, by a partition plate 110. At the center of the partition plate 110, a first valve bore surrounding surface 110A is formed. At the side of the first communication chamber 103A in this first valve bore surrounding surface 110A, a first valve seating surface 110B is formed. Also, at the side of the second communication chamber 103B in the first valve bore surrounding surface 110A, a plurality of passage grooves 110C not penetrating to an axial direction are formed along the surrounding surface. This passage groove 110C works together with a constricted portion at the center of a first valve body 120 to form a fluid passage for running a working fluid when a first valve surface 120A of the first valve body 120 moves away from the first valve seating surface 110B to open.

Also, in the main body 102, a first pressure chamber 108 is formed between the first communication chamber 103A and discharge port 107. A first sliding surrounding surface 108A is formed on a circumference of this first pressure chamber 108. This first sliding surrounding surface 108A is provided with a first annular groove to fit a first seal ring S1 in. Further, in the main body 102, a second pressure chamber 109 is formed to communicate with the second communication chamber 103B. A second sliding surrounding surface 109A is provided on a circumference of the second pressure chamber 109. This second sliding surrounding surface 109A is provided with a second annular groove to fit a second seal ring S2 in.

Also, the first valve body 120 provided with an outer circumference surface 120C, movably fitted with the first sliding surrounding surface 108A of the main body 102 and the first valve bore surrounding surface 110A of the partition plate 110, is arranged. An axis of the first valve body 120 is provided with a communication passage 120D communicating with the first pressure chamber 108 and second pressure chamber 109. Also, this first valve body 120 is elastically pressed toward a second valve body 125 by a first spring 140A arranged in the first pressure chamber 108. Also, the first valve body 120 is provided with the first valve surface 120A at the intermediate part as well as the second valve surface 120B at the apical end. Also, a second spring 140B is arranged between the first valve body 120 and second valve body 125, and the first valve body 120 and the second valve body 125 are elastically pressed by the second spring 140B in opposing directions.

Further, the second valve body 125 movably fitted with the second sliding surrounding surface 109A of the main body 102 is arranged. The second valve body 125 is cylindrically formed and provided with a second valve seating surface 125A having a tapered surface in the internal surrounding surface of one end portion of the second valve body 125. Also, an end of a solenoid rod 151 is connected to a fitting bore provided with a plurality of passages 125C along the surrounding surface of the other end portion of the second valve body 125. Both ends of the solenoid rod 151 are slidably introduced by a first bearing 154A and a second bearing 154B. Then, the solenoid rod 151 is operated according to the magnitude of electrical current flowing in the solenoid 150 to open or close the second valve seating surface 125A of the second valve body 125 with regard to the second valve surface 120B.

The operation of thus-constituted pressure control valve 100 is initiated by closing the first valve surface 120A of the first valve body 120 with regard to the first valve seating surface 110B due to elasticity of the first spring 140A. Then, the working fluid running in from the input port 105 is blocked by the closing of the first valve surface 120A. Also, when the solenoid 150 works, the second valve surface 120B of the first valve body 120 and the second valve seating surface 125A of the second valve body 125 are jointed to close, and the first valve surface 120A of the first valve body 120 is separated from the first valve seating surface 110B to open. By the opening of the first valve surface 120A, the working fluid running in from the input port 105 runs out into the second communication chamber 103B. Note that in the opening/closing shown in FIG. 8, the first valve body 120 and second valve body 125 are opened, so that the working fluid runs out from the output port 106 to the discharge port 107.

Then, in the pressure control valve 100, the first valve body 120 is opened/closed by sliding its outer circumference surface 120C and the first sliding surrounding surface 108A, and also slides while the first seal ring S1 provided between the sliding surfaces and the outer circumference surface 120C strongly friction. Therefore, the first valve body 120 has large sliding resistance during the opening/closing. Particularly, when the pressure of the working fluid is high, the first seal ring S1 is radially extended by this pressure to be elastically deformed, so that the first seal ring S1 slides while strongly frictioning with the cohesive first valve body 120. Therefore, the sliding resistance of the first valve body 120 becomes large, causing to lower the response performance of the opening/closing of the pressure proportional control valve 100.

Also, the outer circumference surface 120C of the first valve body 120 slides with the first sliding surrounding surface 108A. The working fluid intrudes between the sliding surfaces, so that external impurities included in the working fluid may intervene between the sliding surfaces. Therefore, the first valve body 120 pressed by the first spring 140A in which the force changes depending on the displaced position may cause delayed response during the operation. Further, this first valve body 120 is pressed to one surface, possibly causing stick phenomenon (so-called hydrolock) between the sliding surfaces. As a result, operation property of the pressure proportional control valve 100 is changed to increase hysteresis phenomenon in the relation between the pressure and amount of flow of the working fluid. Further, the constitution to simultaneously slide the first valve body 120 along to two distant axes of the first sliding surrounding surface 108A and the first valve bore surrounding surface 110A elevates the costs of assembly and processing.

Figure 9:
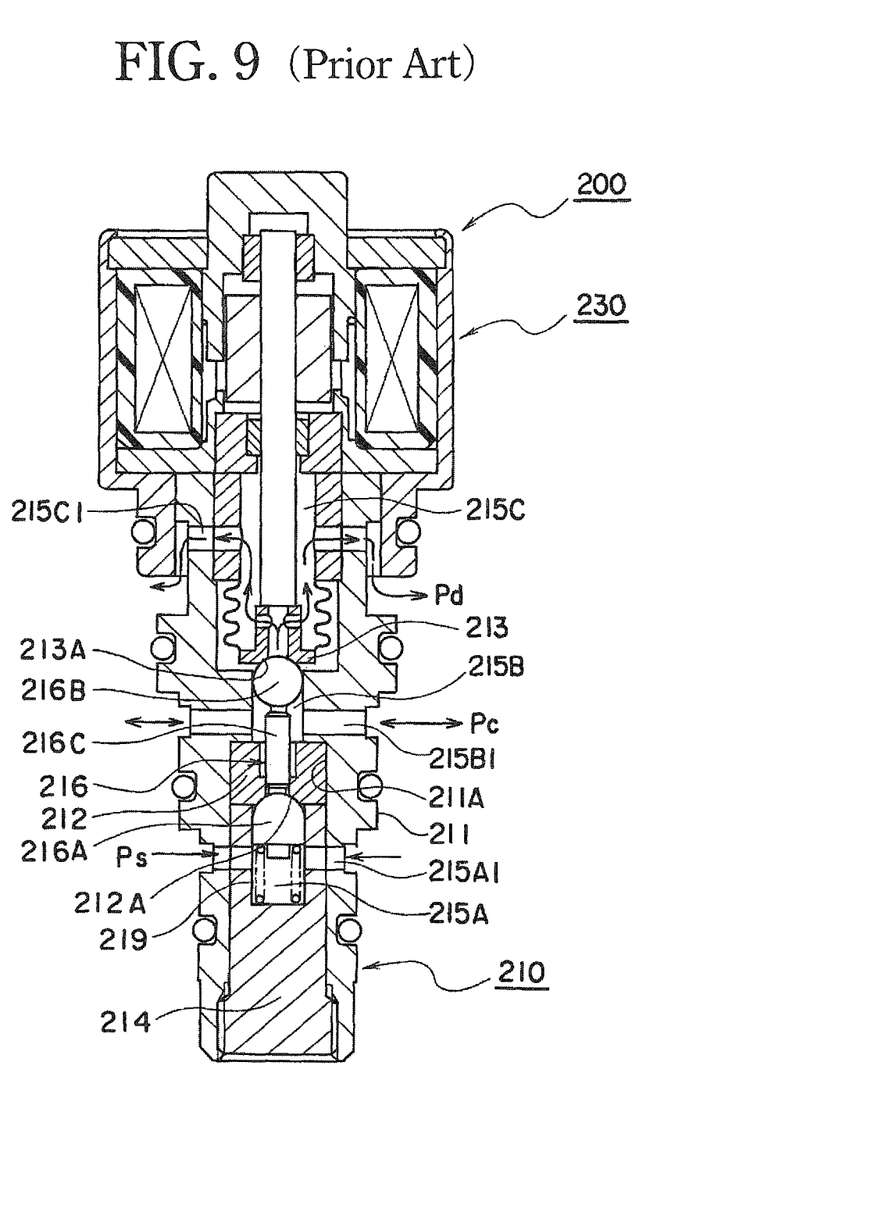
FIG. 9 is a full sectional view of a control valve of another prior art of the present invention.

Further, there is a solenoid valve as shown in FIG. 9 as a related art of the present invention (e.g. Japanese Unexamined Patent Publication 2002-295708 (Patent Document 2)). FIG. 9 shows a structure in which a valve portion 210 and a solenoid 230 are integrated. In this valve portion 210, a valve sleeve 211 is internally provided with a through-hole 211A. The through-hole 211A of the valve sleeve 211 is partitioned by a first valve seat 212, a second valve seat 213 and a screw 214 to form an inflow chamber 215A, a pressure controlling chamber 215B and an outflow chamber 215C. To the inflow chamber 215A, an inflow port 215A1 communicates. Also, to the pressure controlling chamber 215B, a pressure controlling port 215B1 communicates. Further, to the outflow chamber 215C, an outflow port 215C1 communicates.

Also, a first valve body 216A is placed in the inflow chamber 215A. The first valve body 216A is elastically pressed by a spring 219 to contact and separate with a first valve seating surface 212A of the first valve seat 212, so that a first poppet valve is constituted. The first poppet valve is opened and/or closed by an interacting force between the solenoid 230 and the spring 219 to open/close a passage between the inflow chamber 215A and the pressure controlling chamber 215B. Also, a second valve body 216B is placed in the pressure controlling chamber 215B. Then, the first valve body 216A and the second valve body 216B are connected via a connecting portion 216C to constitute a connecting valve body 216 as a whole. The second valve body 216B contacts and separates with a second valve seating surface 213A of the second valve seat 213 to constitute a second poppet valve. The second poppet valve is opened and/or closed by an interacting force between the solenoid 230 and the spring 219 to open/close a passage between the pressure controlling chamber 215B and the outflow chamber 215C.

Thus-constituted valve portion 210 works, as with the above-described pressure control valve 100. And, according to the magnitude of electrical current flowing in the solenoid 230, the first poppet valve and the second poppet valve are opened and/or closed to control the working fluid. On the other hand, the pressure of the working fluid flowing from the inflow port 215A1 into the inflow chamber 215A is pressed to transport by a pump, so that the working fluid may pulse (fluctuate). The pulsing pressure coming in from the inflow port 215A1 works on a back surface 216A1 of the first valve body 216A at the side of spring 219, which may cause the connecting valve body 216 to pulse to move. Therefore, it may be difficult to control the working fluid properly by automatically opening/closing the first poppet valve and the second poppet valve depending on fluctuating pressure.

[Patent Document 1] Japanese Unexamined Patent Publication No. 2004-197858

[Patent Document 2] Japanese Unexamined Patent Publication No. 2002-295708

DISCLOSURE OF INVENTION

Problems to be Solved by the Invention

The present invention was made reflecting the above-described problems and the problems to be solved by the invention are to decrease sliding resistance of a valve body and to improve response performance of opening/closing against application force of the valve body. In addition, the present invention aims at reducing hysteresis phenomenon of the control valve. Also, the purpose of the present invention is to decrease the sliding resistance of the valve body and to improve response performance of opening/closing of the valve body even when a working fluid is high in pressure. Further, the present invention aims at reducing the cost of processing in the control valve and the cost of assembling its parts.

Means for Solving the Problems

The present invention was made to solve the above-described technical problems, and technical means for solving the problems is as follows.

Namely, a control valve of the present invention is a control valve for controlling an amount of flow of a fluid with controlling pressure, and comprises: a main body having a partition portion dividing an inside of a valve space chamber into a first valve chamber and a second valve chamber, said partition portion being provided with a bore-forming surface for a through-hole penetrating said first valve chamber and said second valve chamber, and said bore-forming surface being provided with a first valve seating surface at a side of the first valve chamber; a supply port penetrating into said first valve chamber of said main body and flowing a fluid with supply pressure; an output port penetrating into said second valve chamber of said main body and flowing the fluid with controlling pressure; a discharge port penetrating into said first valve chamber of said main body and flowing a fluid with discharge pressure; a first pressure-sensing spring device having an elastically-stretchable cylindrical shape, the first pressure-sensing spring device being arranged in said first valve chamber, and provided with a connecting portion surrounding said discharge port in one end surrounding portion of the first pressure-sensing spring device to connect with the main body and a first communication bore in an inner circumference surface of the first pressure-sensing spring device to communicate with said discharge port; a valve body connected with a free end surrounding portion of said first pressure-sensing spring device in an end portion of the valve body, the valve body having a second communication bore communicating with said first communication bore provided in the first pressure-sensing spring device, a fuselage portion forming a first flow passage between said bore-forming surface and itself, a first valve portion surface comprised of one side of a first poppet valve to open/close said first flow passage by contacting and separating with said first valve seating surface, and a second valve portion surface formed on a second valve portion arranged in said second valve chamber at an end of said fuselage portion; a valve seat body having a second valve seating surface comprised of one side of a second poppet valve to open/close between said second valve chamber and said second communication bore by contacting and separating with said second valve portion surface of said valve body, and a second internal through-hole communicatable with said second communication bore; a second pressure-sensing spring device having an elastically stretchable cylindrical shape, the second pressure-sensing spring device being arranged in said second valve chamber to connect with the main body at one end surrounding portion of the second pressure-sensing spring device, and provided with a first internal through-hole communicatable with said second internal through-hole in an inner circumference surface of the second pressure-sensing spring device by connecting a free end surrounding portion of the second pressure-sensing spring device with said valve seat body to cover said second internal through-hole on one side; and a solenoid portion configured to move a solenoid rod connecting with said valve seat body toward said valve seat body according to a magnitude of electrical current, wherein said first valve portion surface and said first valve seating surface constitute said first poppet valve, wherein said second valve portion surface and said second valve surface constitute said second poppet valve, and wherein each pressure receiving area of a first effective pressure receiving area of said first pressure-sensing spring device, a second effective pressure receiving area of said second pressure-sensing spring device, a first pressure receiving area of an inner diameter surface where said first valve seating surface and said first valve portion surface are jointed, and a second pressure receiving area of an inner diameter surface where said second valve seating surface and said second valve portion surface are jointed is made to be substantially equal.

In thus-constituted control valve, each of the following pressure receiving areas is almost equally made: the first effective pressure receiving area of the first pressure-sensing spring device, the second effective pressure receiving area of the second pressure-sensing spring device, and the first pressure receiving area of an inner diameter surface where the first valve seating surface and the first valve portion surface are jointed, and the second pressure receiving area of the inner diameter surface where the second valve seating surface and the second valve portion surface are jointed. Therefore, unbalanced force received from pressure fluid flowing in when operating each poppet valve is all canceled. Namely, even when a fluid with fluctuating pressure caused by a squeeze pump, etc. flows into the first valve chamber, the fluctuating pressure of the fluid is received by almost equal pressure receiving areas, so that the received forces are same to cancel any opposite force. When fluctuating pressure is applied onto the first poppet valve and the second poppet valve, a ratio of valve opening of the first poppet valve and the second poppet valve is controlled by the solenoid rod moving from the solenoid portion in response to the magnitude of electrical current, so that the capacity control can be secured. Further, since the valve body, the first pressure-sensing spring device, the second pressure-sensing spring device and the valve seat body are operated without sliding with other surfaces at operation, the poppet valve allows flowing an accurate amount of the fluid with desirably controlled pressure to control capacity without inducing any trouble in sliding surface by the extraneous matter, even when extraneous matter included in a supply fluid or a fluid flowing in from a control instrument adheres to the surfaces.

Also, the valve surface and the valve seating surface of the first poppet valve and the second poppet valve do not repeatedly collide and contact (pulse) by fluctuating pressure of the fluid, and it is possible prevent the valve surface from abrasion. Also, since the first pressure-sensing spring device and the second pressure-sensing spring device combine spring means and flow passage for the working fluid, the control valve becomes simple in structure. The simply-structured control valve rarely causes troubles during the operation, which results in improving durability. Further, the simply-structured control valve can greatly reduce production cost, and is available in a diversion valve etc. to expand the application.

Preferably, in the control valve of the present invention, the end portion of said valve body is formed as a stepped fitting portions, and the free end surrounding portion of said first pressure-sensing device is hermetically fitted to the stepped fitting portion in the end portion end portion of said valve body.

According to thus-constituted control valve, the connecting portion between the end portion of the valve body and the free end surrounding portion of the first pressure-sensing spring device is adapted to engage, so that it is possible to effectively prevent damaging the connecting portion, which easily causes metal fatigue during the operation, without holding the first pressure-sensing spring device and the valve body by a guiding component. Further, the connection between the pressure-sensing spring device and the valve body or valve seat body is made easy.

Also preferably, in the control valve of the present invention, said discharge port provided near a center of said main body, said first communication bore of said first pressure-sensing spring device and said second communication bore provided near an axis of said valve body are substantially aligned.

According to thus-constituted control valve, the fuselage portion where the first valve portion and the second valve portion of the valve body are connected is formed with a flow passage between the valve bore surface and itself, so that the fluid flowing in the fuselage portion allows stabilizing the fuselage portion to hold it at an axis of the valve bore surface. Therefore, without any guiding component to the valve body, the first valve portion surface can reliably be jointed with the first valve seating surface. In addition, since the first pressure receiving area of the valve body and the first effective pressure receiving area of the first pressure-sensing spring device are made to be equal, opposite forces are canceled each other even when working pressure is applied on both of the valve body and first pressure-sensing spring device. Therefore, the valve body does not receive unnecessary external force, and the opening/closing of the valve body can be controlled as set up.

BEST MODE FOR CARRYING OUT THE INVENTION

Hereinafter, control valves of embodiments according to the present invention will be explained in detail based on drawings.

Figure 1:
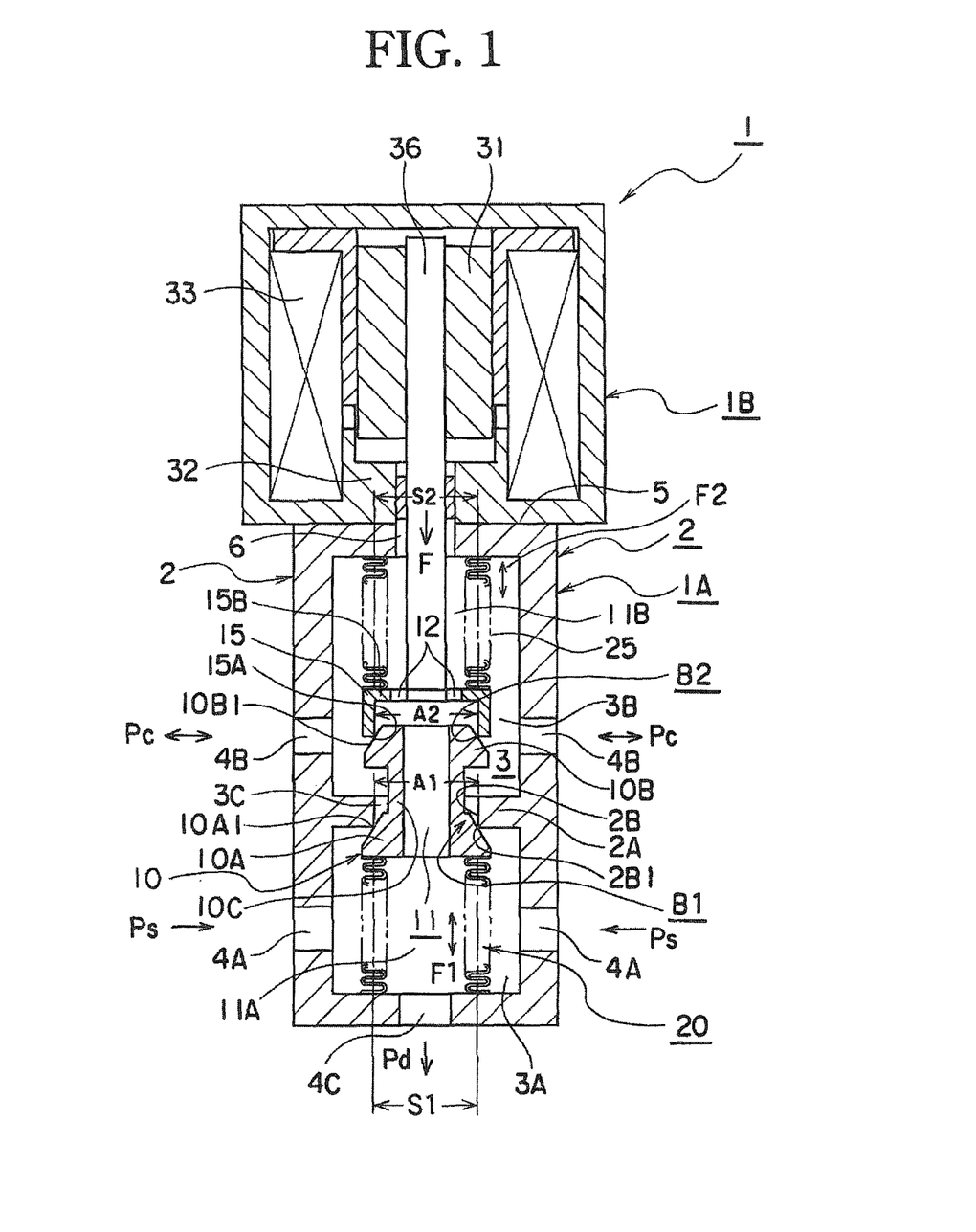
FIG. 1 is a full sectional view of a control valve according to a first embodiment of the present invention.

FIG. 1 is a sectional view of a control valve 1 showing a first embodiment according to the present invention. In FIG. 1, the control valve 1 controls a capacity (a ratio of valve opening). The control valve 1 is integrally formed by uniting a control valve portion 1A and a solenoid portion 1B. An outer frame of the control valve portion 1A is a main body 2. The inside of the main body 2 is provided with a valve space chamber 3 having an axially-long shape. The valve space chamber 3 is divided by a partition portion 2A to form a first valve chamber 3A at one side of the partition portion 2A and a second valve chamber 3B at the other side. Further, the partition portion 2A is provided with a valve bore surface 2B in the surrounding surface of a through-hole penetrating the first valve chamber 3A and second valve chamber 3B at its axis. Also, a first valve seating surface 2B1 is formed in an end portion at the side of the first valve chamber 3A in the valve bore surface 2B. The main body 2 is made of metal such as iron, brass, copper, aluminum, stainless and synthetic resin material such as industrial plastic and special resin.

Further, a supply port 4A penetrating from the outer circumference surface to the first valve chamber 3A and a discharge port 4C penetrating from the first valve chamber 3A to the outside of the axial direction are formed in the main body 2. Note that the multiple supply ports 4A is provided along the circumferential direction. Also, multiple output ports 4B penetrating from the outer circumference surface of the main body 2 to the second valve chamber 3B is provided along the outer circumference surface. Further, the other end portion of the second valve chamber 3B of the main body 2 at the side of the solenoid portion 1B is provided with a through-hole 6 for a solenoid rod 36 axially penetrating. Also, a mounting surface 5 to fit the solenoid portion 1B in is provided in the other end portion of the main body 2. Note that the supply port 4A allows a fluid with supply pressure Ps flowing in. Also, the output port 4B allows a fluid with controlling pressure Pc flowing out or in. Further, the discharge port 4C allows discharging a fluid with discharge pressure Pd.

In a valve body 10, a first valve portion 10A and a second valve portion 10B in one end of a fuselage portion 10C having a cylindrical shape are formed, and for convenience of assembly into a valve bore surface 2B, for example, an outer circumference surface of the end portion of the fuselage portion 10C is fitted in a fitting bore provided in an end portion of the first valve portion 10A to connect. Note that the valve body 10 is made of metal such as brass, copper, aluminum, stainless, or synthetic resin material, etc. Also, in the valve bore surface 2B, the fuselage portion 10C of the valve body 10 is loosely fitted to arrange. The space where the fuselage portion 10C and the valve bore surface 2B are loosely fitted is formed to be a first flow passage 3C. Also, the valve body 10 moves up and down to open/close, but the fuselage portion 10C and the valve bore surface 2B form a space therebetween not to contact each other, resulting in no sliding resistance. Also, the fuselage portion 10C does not slide, so that the adherence of an extraneous matter thereto does not cause troubles.

The valve body 10 will be explained further in detail. In the valve body 10, the first valve portion 10A integrated with the fuselage portion 10C is arranged at the side of the first valve chamber 3A. The first valve portion 10A is formed with a first valve portion surface 10A1, which is tapered toward the fuselage portion 10C. When the tapered surface moves into the valve bore surface 2B, the first valve portion surface 10A1 of the valve body 10 is jointed to a first valve seating surface 2B1 to close, and moves away from the first valve seating surface 2B1 to open. That is, the first valve portion surface 10A1 and the first valve seating surface 2B1 may constitute a first poppet valve B1 in which its cylindrical surface does not fit in. Note that in the following context, the valve portion surface contacts with the valve seating surface in minimal width in the poppet valve, so that it is possible not to cause sliding resistance at opening/closing. Also, the cross-sectional area of its inner diameter portion where the first valve portion surface 10A1 and the first valve seating surface 2B1 are jointed is the first pressure receiving area A1 where working fluid pressure is received. Then, when the first valve portion surface 10A1 opens with respect to the first valve seating surface 2B1, the fluid with supply pressure Ps is supplied from the first valve chamber 3A to the second valve chamber 3B through the first flow passage 3C. Further, in the second valve chamber 3B, the second valve portion 10B, the other end portion of the fuselage portion 10C, is arranged. The second valve portion 10B is also formed with a second valve portion surface 10B1, which is tapered toward the end. Also, in the valve body 10, a second communication bore (hereinafter referred to as a second communication passage) 11 penetrating from the first valve portion 10A to the second valve portion 10B is formed.

Also, a first pressure-sensing spring device (hereinafter referred to as a first pressure-sensing device) 20 arranged in the first valve chamber 3A is formed into a cylindrical bellows having a wavy cross-sectional surface, and a first communication bore (hereinafter referred to as a first communication passage) 11A is provided therein. In the first pressure-sensing device 20, an area to receive supply pressure Ps (an area of whole circumference of an effective diameter) is a first effective pressure receiving area S1. Also, an elastic spring means of the first pressure-sensing device 20 is a compressed spring, and its spring force is F1. A free surrounding portion of the cylindrical end portion of the first pressure-sensing device 20 is hermetically fitted to a stepped fitting portion in an end portion of the first valve portion 10A to constitute a connecting portion so as to middle the second communication passage 11, and the other end surrounding portion is connect with the main body 2 so as to middle the discharge port 4C (FIG. 1 does not show the connecting portion in detail). Note that the fitting of the first pressure-sensing device 20 and the first valve portion 10A may be achieved by forming the stepped fitting portion at the side of the free end portion of the first pressure-sensing device 20, and fitting the end portion of the first valve portion 10A therein. An outer diameter of the end portion of the first valve portion 10A may be almost equal in size of the outer diameter of the first pressure-sensing device 20 coupled therewith. That is, the first communication passage 11A of the first pressure-sensing device 20 communicates with the second communication passage 11 of the valve body 10, and also communicates with the discharge port 4C. Also, the spring force F1 of the first pressure-sensing device 20 elastically presses the valve body 10 toward the solenoid portion 1B. As for the first communication passage 11A, when the second valve portion surface 10B1 is separated from the second valve seating surface 15A of the valve seat body 15 to open, the second valve chamber 3B and the discharge port 4C are communicated through the second communication passage 11 and the first communication passage 11A. Note that for the connecting portion of the first valve portion 10A of the valve body 10 and free end surrounding portion of the first pressure-sensing device 20, the surrounding portion for fitting of the free end surrounding portion of the first pressure-sensing device may be fitted in and coupled with the inner surrounding portion provided in the end portion of the valve body.

Further, the valve seat body 15 is formed into a bottomed cylindrical portion. Note that it may be a cylindrical portion when connecting with the solenoid rod 36 via a component. The second valve seating surface 15A provided in corner portion of one end of the inner circumference of the valve seat body 15 is contacted and separated with the second valve portion surface 10B1 of the second valve portion 10B to open/close. The second valve portion surface 10B1 and the second valve seating surface 15A have minimal contact width and are jointed in to constitute a second poppet valve B2 to open/close. Note that an area to receive the fluid with controlling pressure Pc in a cross-sectional surface of an inner diameter portion where the second valve portion surface 10B1 and second valve seating surface 15A are jointed is a second pressure receiving area A2. In the first embodiment, the first pressure receiving area A1 and second pressure receiving area A2 are almost equally formed in size. Note that "almost equal" indicates being within the range of ±6%, which allows achieving almost equal effects. Also, a bottom portion 15B of the valve seat body 15 is coupled with or jointed to a lower end portion of the solenoid rod 36 as shown in the figure, and the second valve seating surface 15A and second valve portion surface 10B1 are contacted and separated by operation of the solenoid portion 1B to constitute a poppet valve B2.

Also, multiple second internal passages 12 are provided in the bottom portion 15B so as to introduce a fluid from the second internal passages 12 into the first internal passage 11B in the after-mentioned second pressure-sensing spring device 25 (hereinafter referred to as a second pressure-sensing device) when opening the second poppet valve B2. Simultaneously, the second internal passage 12 allows always communicating the first internal passage 11B and second communication passage 11 with the first communication passage 11A and the discharge port 4C. Then, the fluid flowing in the first internal passage 11B acts on each component in the second pressure-sensing device 25 and in the solenoid portion 1B communicatable therewith, and maintains the balance of pressure to prevent the fluid pressure from acting only on one surface (the fluid is also flowing from the first internal passage 11B into the solenoid portion 1B). Note that the first pressure-sensing device 20 has not only a function as spring means but also a function of the first communication passage 11A to allow the fluid with controlling pressure Pc to flow by communicating with the second valve chamber 3B when the second poppet valve B2 opens. Therefore, the first pressure-sensing device 20 only elastically elongates and contracts when moving the valve body 10, and has no fitting surfaces, so that it is possible to avoid sliding friction resistance.

Also, the second pressure-sensing device 25 is arranged between the bottom portion 15B of the valve seat body 15 and main body 2 in the second valve chamber 3B. The second pressure-sensing device 25 is formed into a bellows having a wavy cross-sectional surface and a cylindrical shape, and the first internal passage 11B penetrating therein is formed. The second pressure-sensing device 25 becomes a stretch spring when the solenoid rod 36 moves downward in the figure. The spring force of the second pressure-sensing device 25 is F2 (see FIG. 3). A free end surrounding portion of the cylindrical portion of the second pressure-sensing device 25 is formed into an inner fit surface, and closely fitted with a staged fitting portion formed around the second internal passage 12 of the bottom portion 15B to constitute a connecting portion (FIG. 1 does not show the connecting portion in detail), and also the other end surrounding portion is connected with the main body 2 so as to surround the solenoid rod 36. Also, when the solenoid portion 1B does not work, the valve seat body 15 is separated from the valve body 10 to open by the spring force F2 of the second pressure-sensing device 25. Note that the second pressure-sensing device 25 has not only a function as a stretch spring means, but also a function to communicate the second valve chamber 3B and the first internal passage 11B via the second internal passage 12 and to flow the fluid with controlling pressure Pc when the second poppet valve B2 opens. Therefore, the second pressure-sensing device 25 only elastically elongates and contracts without fit components when moving the valve seat body 15, so that it is possible to avoid sliding friction resistance.

Figure 2:
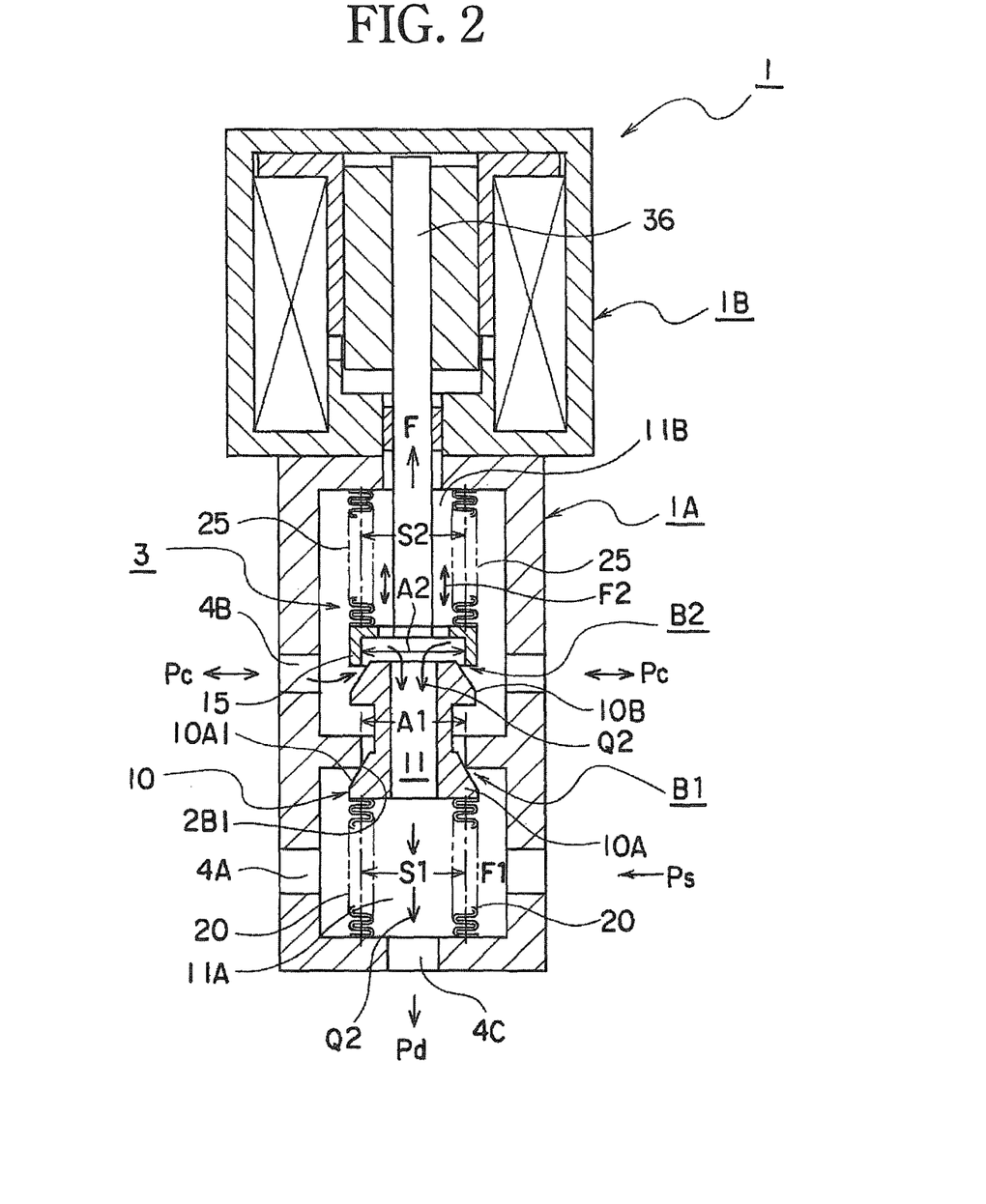
FIG. 2 is a full sectional view of a control valve showing the first operating condition of the control valve in FIG. 1.

The solenoid portion 1B is, as described above, connected with the mounting surface 5 of the control valve portion 1A. The solenoid portion 1B is a conventionally-known structure applied to the operation of the control valve portion 1A, so that it will briefly be explained. The solenoid portion 1B is internally provided with a movable core 31, and the movable core 31 is coupled with the solenoid rod 36. Also, a stationary core 32 is provided in an opposed position of the movable core 31. A magnet coil 33 is arranged in the outer circumferences of the movable core 31 and the stationary core 32 to configure electromagnetic circuit. When electric current is applied to the magnet coil 33, the movable core 31 is suctioned into the stationary core 32 by magnetic force generated in the electromagnetic circuit in response to the magnitude of electrical current. When the movable core 31 is suctioned, the solenoid rod 36 integrated with the movable core 31 moves forward with the movable core 31 to extend the second pressure-sensing device 25 and to press the valve seat body 15. Simultaneously, when the valve seat body 15 moves, the valve seat body 15 moves downward in the figure while closing with respect to the valve body 10, which makes the first valve portion surface 10A1 separate from the first valve seating surface 2B1 to open. At this time, the first pressure-sensing device 20 is compressed by the magnetic force F Next, the operating condition of the control valve 1 will be explained based on FIG. 1, FIG. 2 and FIG. 3. The control valve 1 shown in FIG. 2 only shows a different operating condition but has the same structure as shown with the same symbols as in the control valve 1 of FIG. 1. FIG. 2 shows operating condition of the control valve portion 1 A when not applying electric current to the solenoid portion 1 B. The operating condition of opening/closing of the first poppet valve B1 and second poppet valve B2 of FIG. 2 is as shown in FIG. 2. Namely, the movable core 31 and the stationary core 32 are separated since there is no magnetic force working between the movable core 31 and the stationary core 32. Simultaneously, the valve seat body 15 is moved toward the solenoid portion 1B by tension of the second spring force F2 of the second pressure-sensing device 25. Also, the second valve seating surface 15A separates from the second valve portion surface 10B1 to open. The second poppet valve B2 formed by the second valve portion surface 10B1 and the second valve seating surface 15A is in the state of opening, so that the fluid flows from the second valve chamber 3B into the second communication passage 11. Then, when the second poppet valve B2 opens, for example, a fluid with controlling pressure Pc for a hydraulics brake of an automatic transmission which is not indicated in the drawings can be discharged from the second valve chamber 3B to the discharge port 4C through the second communication passage 11 and first communication passage 11 A. Namely, when stopping the electric current to the solenoid portion 1 B, the controlling pressure Pc can be lowered. Also, when the second poppet valve B2 opens, the pressure in the first internal passage 11B becomes equivalent to that in the second valve chamber 3B through the second internal passage 12. Since the first pressure receiving area A1, the second pressure receiving area A2, the first effective pressure receiving area S1 and the second effective pressure receiving area S2 are made to have same area, each other's force received from the working fluid is canceled. Also, the valve body 10 cannot move toward the valve seat body 15 when the first poppet valve B1 closes, so that the second valve seating surface 15A is separated from the second valve portion surface 10B1 by the second spring force F2 of the second pressure-sensing device 25 to open the second poppet valve B2.

At the same time of the opening of the second poppet valve B2, the valve body 10 is pressed by the first spring force F1 by the first pressure-sensing device 20 to allow the first valve portion surface 10A1 jointing with the first valve seating surface 2B1. Then, the first poppet valve B1 formed by the first valve portion surface 10A1 and the first valve seating surface 2B1 closes. Therefore, the fluid with supply pressure Ps supplied from the supply port 4A is blocked by the first poppet valve B1 and stopped flowing into the second valve chamber 3B.

Figure 3:
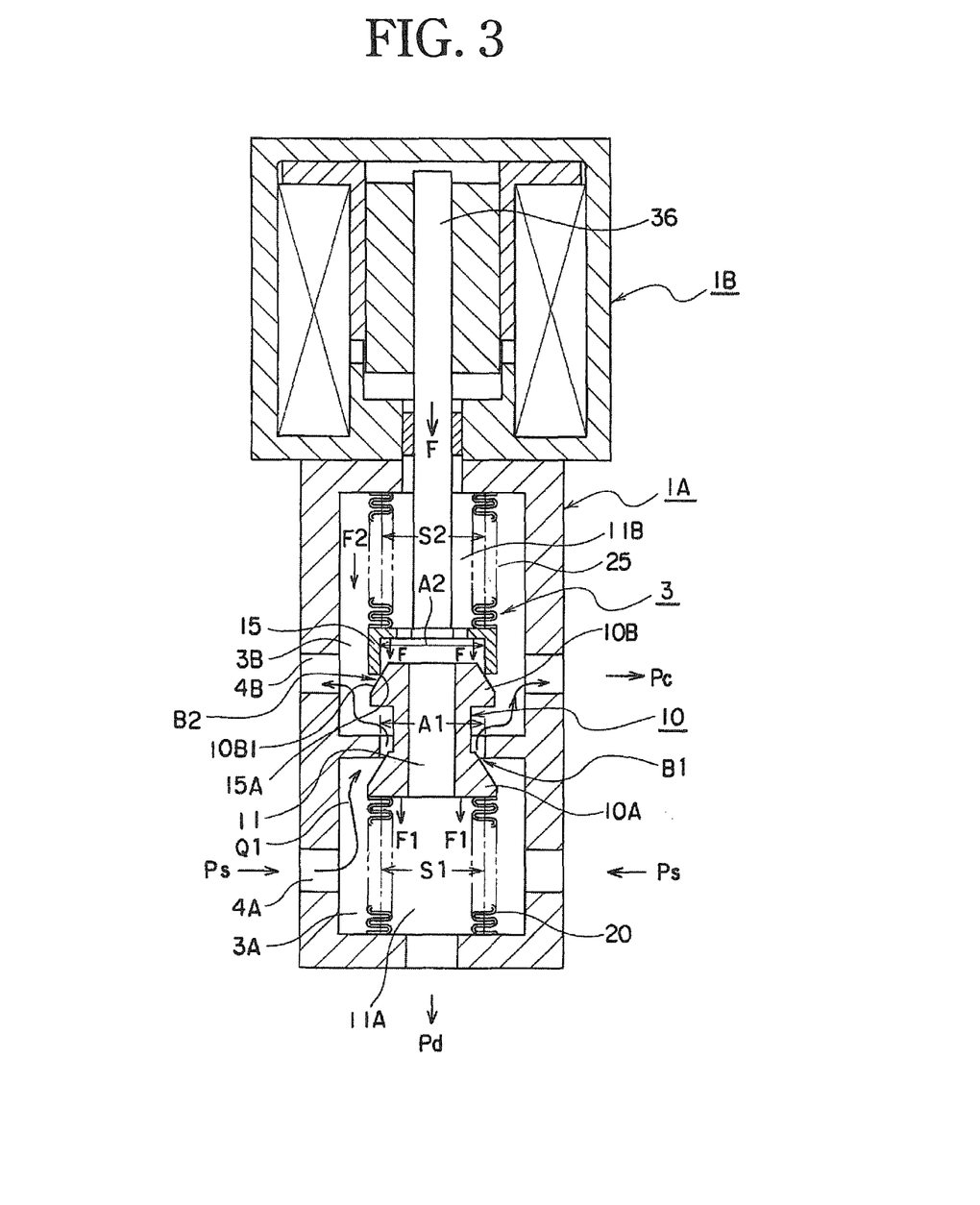
FIG. 3 is a full sectional view of a control valve showing the second operating condition of the control valve in FIG. 1.

A control valve 1 shown in FIG. 3 only shows a different operating condition but has the same structure as shown with the same symbols as in the control valve 1 of FIG. 1. In FIG. 3, larger electric current is applied to the solenoid portion 1B compared to the operating condition of the control valve 1 in FIG. 1. In this case, the operating condition of opening/closing of the first poppet valve B1 and second poppet valve B2 is as shown in FIG. 3. Namely, the movable core 31 and the stationary core 32 maximally come close since the magnetic field (force) is greatly worked each other between the movable core 31 and the stationary core 32. Then, the solenoid rod 36 connecting to the movable core 31 extends the second spring force F2 of the second pressure-sensing device 25 and simultaneously allows moving the valve seat body 15 toward the valve body 10. The second valve seating surface 15A then is jointed to the second valve portion surface 10B1 to make the second poppet valve B2 close. Therefore, the flow of the fluid between the second valve chamber 3B and second communication passage 11 is blocked, so that the fluid with controlling pressure Pc running in the output port 4B is prevented from flowing out toward the discharge port 4C.

Simultaneously, the first poppet valve B1 opens, and therefore, the fluid with supply pressure Ps supplied from the supply port 4A runs in the first flow passage 3C between the first valve seating surface 2B1 and the first valve portion surface 10A1 to flow into the second valve chamber 3B. Then, it makes the amount of flow of the fluid with controlling pressure Pc increase at the side of the output port 4B (e.g. in the hydraulics brake). For the valve body 10 in the first valve chamber 3A, since the first pressure receiving area and second pressure receiving area, and the first pressure receiving area A1 and first effective pressure receiving area S1 are almost equally formed, unbalanced force due to fluctuating pressure from the fluid with supply pressure Ps is canceled and the valve body 10 is effectively prevented from fluctuating due to the supply pressure Ps even when the fluid with supply pressure Ps supplied from hydraulic pump fluctuates, so that a ratio of valve opening for opening/closing the first poppet valve B1 can be opened/closed as set up in response to stroke of the solenoid rod 36 (the control in a ratio of valve opening of the valve). Also, respective valve portions of the valve body 10 take poppet form, and the fuselage portion 10C is loosely fitted so as to provide a gap between the valve bore surface 2B and itself and does not slide with the valve bore surface 2B at the opening/closing, so that there are no sliding resistance and malfunction even when extraneous matters adhere to the fuselage portion 10C. Further, the first pressure-sensing device 20 takes a cylindrical form with wavy cross-sectional surface, and at the side of its inner and outer circumference surfaces, spaces to flow the working fluid are formed, which is not constituted to slide with the corresponding sliding components as in prior arts. As a result, even when fine powder such as solid matter or abrasion powder, which is sometimes contained in the fluid with supply pressure Ps supplied from a compressor, etc., adheres to the valve body 10, no sliding resistance may be caused. Therefore, the valve body 10 can be prevented from malfunction due to fine powder in the fluid. Further, since the first effective pressure receiving area S1 of the first pressure-sensing device 20 and second effective pressure receiving area S2 of the second pressure-sensing device 25, and the first pressure receiving area A1 of the first poppet valve B1 and second pressure receiving area A2 of the second poppet valve B2 are almost equally formed in size, without unnecessary force caused by the working fluid, because of a balanced force between respective spring forces F1 and F2 of the first pressure-sensing device 20 and the second pressure-sensing device 25, and the magnetic force F of the solenoid rod, the valve body 10 can be opened/closed by the force as set up.

FIG. 1 shows the intermediate operating condition between the operating conditions of the control valve 1 in FIG. 2 and control valve 1 in FIG. 3. The operating condition of the control valve 1 in FIG. 1 indicates one embodiment of the opening/closing of the valve body 10, in which electric current runs in the solenoid portion 1B is smaller than that in the operating condition of the control valve 1 shown in FIG. 3 and controlled electric current is running to the solenoid portion 1B. In this case, in the operating condition of the closing of the second poppet valve B2, the first poppet B1 is controlled to open/close in response to electric current running through the solenoid portion 1B. Also, the second poppet valve B2 achieves opening/closing only by force of moving the solenoid rod 36 by the magnetic force F of the solenoid portion 1B, and force of the first spring force F1 of the first pressure-sensing device 20 and second spring force F2 of the second pressure-sensing device 25 to control an amount of flow of the fluid with controlling pressure Pc. Namely, since the first effective pressure receiving area S1 of the first pressure-sensing device 20 and second effective pressure receiving area S2 of the second pressure-sensing device 25, and the first pressure receiving area A1 of the first valve portion 10A (first poppet valve B1) and second pressure receiving area A2 of the second valve portion 10B (second poppet valve B2) are equally formed in size, respectively, the opposite forces are canceled even when respective pressures Ps and Pc of the fluid act on respective pressure receiving areas S1, S2, A1 and A2. Then, the movable core 31 controlled by the magnetic force F is controlled in the distance with the stationary core 32, so that the solenoid rod 36 integrated with the movable core 31 can also be controlled to move. The second valve seating surface 15A of the valve seat body 15 connected with the solenoid rod 36 elastically elongates and contracts the second pressure-sensing device 25 to be jointed with the second valve portion surface 10B1 of the valve body 10 in the state of closing, resulting in controlling a ratio of valve opening for opening-closing of the first poppet valve B1. Namely, the responding movement of the valve body 10 allows controlling the ratio of valve opening for opening/closing of the first valve seating surface 2B1 and the first valve portion surface 10A1 without being effected by fluctuation of the supply pressure Ps. By the controlled opening/closing of the first poppet B1, capacity proportional control of the fluid with supply pressure Ps flowing from the first valve chamber 3A to the second valve chamber 3B is possible.

The control valve 1 allows working the solenoid rod 36 of the solenoid portion 1B depending on the magnitude of electrical current to control a ratio of opening/closing (a ratio of valve opening) of the first poppet valve B1 and second poppet valve B2 by working with the spring forces of the first pressure-sensing device 20 and second pressure-sensing device 25, and achieves capacity controlling by flowing the fluid with controlling pressure Pc depending on the ratio of opening/closing of the valves. At this time, in the constitution to move the first poppet valve B1 and second poppet valve B2 of the control valve 1, a relation of S1=S2=A1=A2 is satisfied, so that any unbalanced force by fluid pressure does not act on the first poppet valve B1 and second poppet valve B2. Therefore, the ratio of opening/closing of the first poppet valve B1 and second poppet valve B2 can be controlled by moving the solenoid rod 36 as set up only with the magnetic force F of the solenoid portion 1B.

Note that

F is a magnetic force of the solenoid portion 1B;

F1 is the first spring force of the first pressure-sensing device 20;

F2 is the second spring force of the second pressure-sensing device 25;

S1 is the first effective pressure receiving area of the first pressure-sensing device 20;

S2 is the second effective pressure receiving area of the second pressure-sensing device 25;

A1 is the first pressure receiving area of the inner diameter surface in the first poppet B1 when closing to joint;

A2 is the second pressure receiving area of the inner diameter surface in the second poppet B2 when closing to joint;

Ps is supply pressure;

Pc is controlling pressure; and each pressure receiving area is constituted to satisfy a relation of S1=S2=A1=A2.

In the pressure proportional control by the conventional control valve, capacity control as set up is difficult when sliding resistance is raised at the operation of the valve body. However, in the control valve 1 of the present invention, no sliding portion is provided for sliding at the operation of the valve body 10, first pressure-sensing device 20, second pressure-sensing device 25 and valve seat body 15, and therefore, no sliding (friction) resistance is raised. Namely, in the valve body 10, the valve body 10 is fitted to the valve bore surface 2B with a space therebetween, so that the outer circumference surface of the fuselage portion 10C does not slide. Also, the valve surfaces of the first poppet valve B1 and second poppet B2 are collided and contacted in the form of line contact with narrow width. Therefore, the first poppet valve B1 and the second poppet B2 are constituted not to cause friction resistance. In addition, the first poppet valve B1 and the second poppet B2 are fitted without sliding surface, an increase in sliding resistance due to adherence of powder between sliding surfaces does not occur. Also, the first pressure-sensing device 20 and second pressure-sensing device 25 take a bellows or diaphragm form; elastically elongate and contract to the axial direction to move with the valve body 10 in response; and have a space to flow the fluid at the sides of inner circumference and outer circumference, so that it is unnecessary to provide a surface to be introduced when elastically displacing the position. Therefore, even when extraneous matters are contained in the fluid, the valve body 10 is supported only by the first pressure-sensing device 20, and it is possible to prevent malfunction due to adhered matters.

Further, in the pressure condition that the fluid acts on the valve body 10 in the opening/closing of the control valve 1, forces received from the supply pressure Ps onto the valve body 10 are canceled each other to the direction of operation since the first effective pressure receiving area S1 of the first pressure-sensing device 20, the first pressure receiving area A1 of the joint inner diameter surface of the first poppet valve B1, the second pressure receiving area A2 of the joint inner diameter surface of the second poppet valve B2 and the second effective pressure receiving area S2 of the second pressure-sensing device 25 are made to have same area in size. For this reason, the valve body 10 has no thrust force received from the supply pressure Ps. Therefore, the valve body 10 can be operated without receiving unnecessary force from the fluid with supply pressure Ps. Consequently, the magnetic force F depending on electric current running through the solenoid portion 1B allows opening/closing the first poppet valve B1 and second poppet valve B2 for capacity control.

Figure 4:
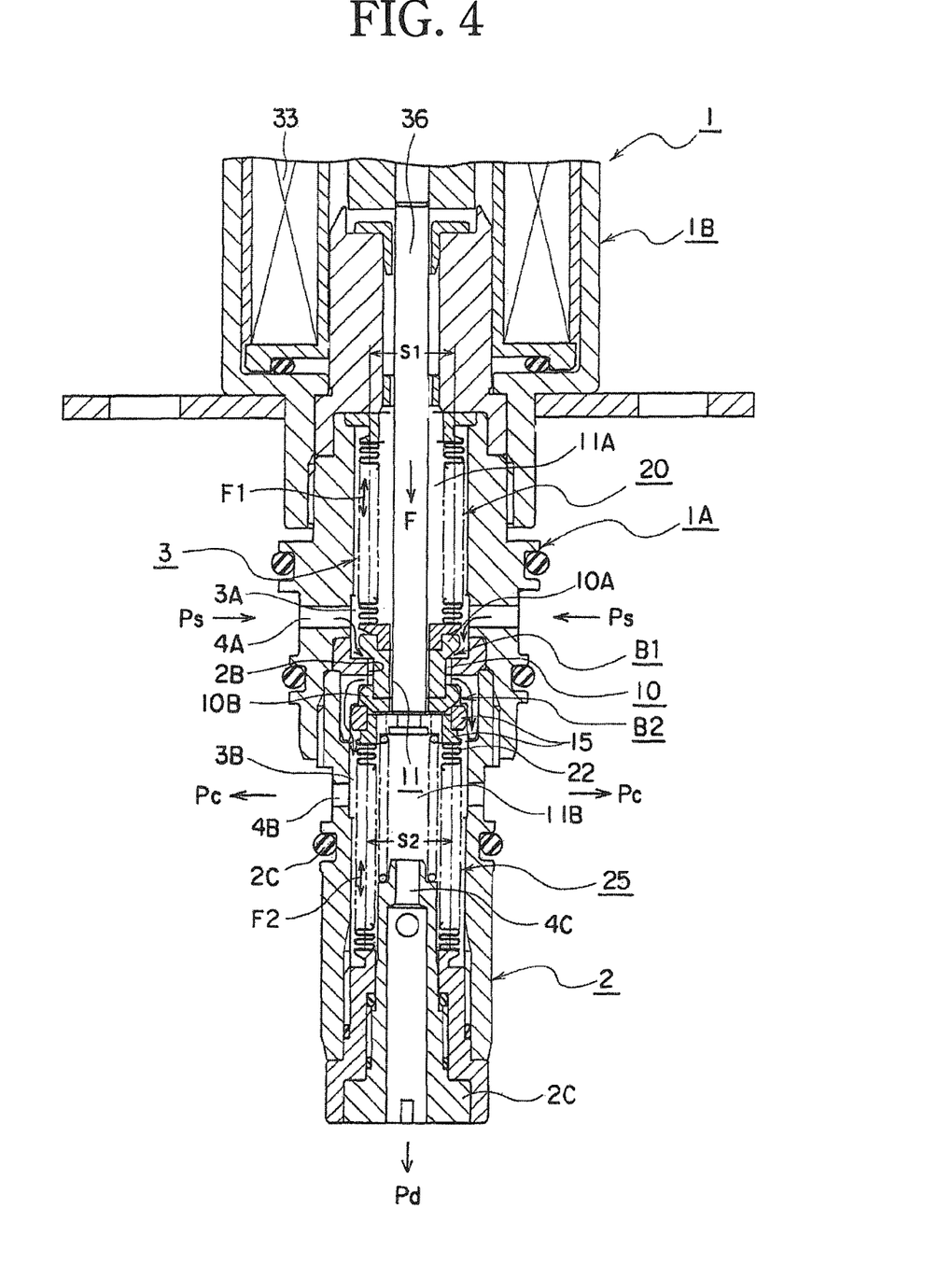
FIG. 4 is a sectional view of a key part of a control valve according to a second embodiment of the present invention.
Figure 5:
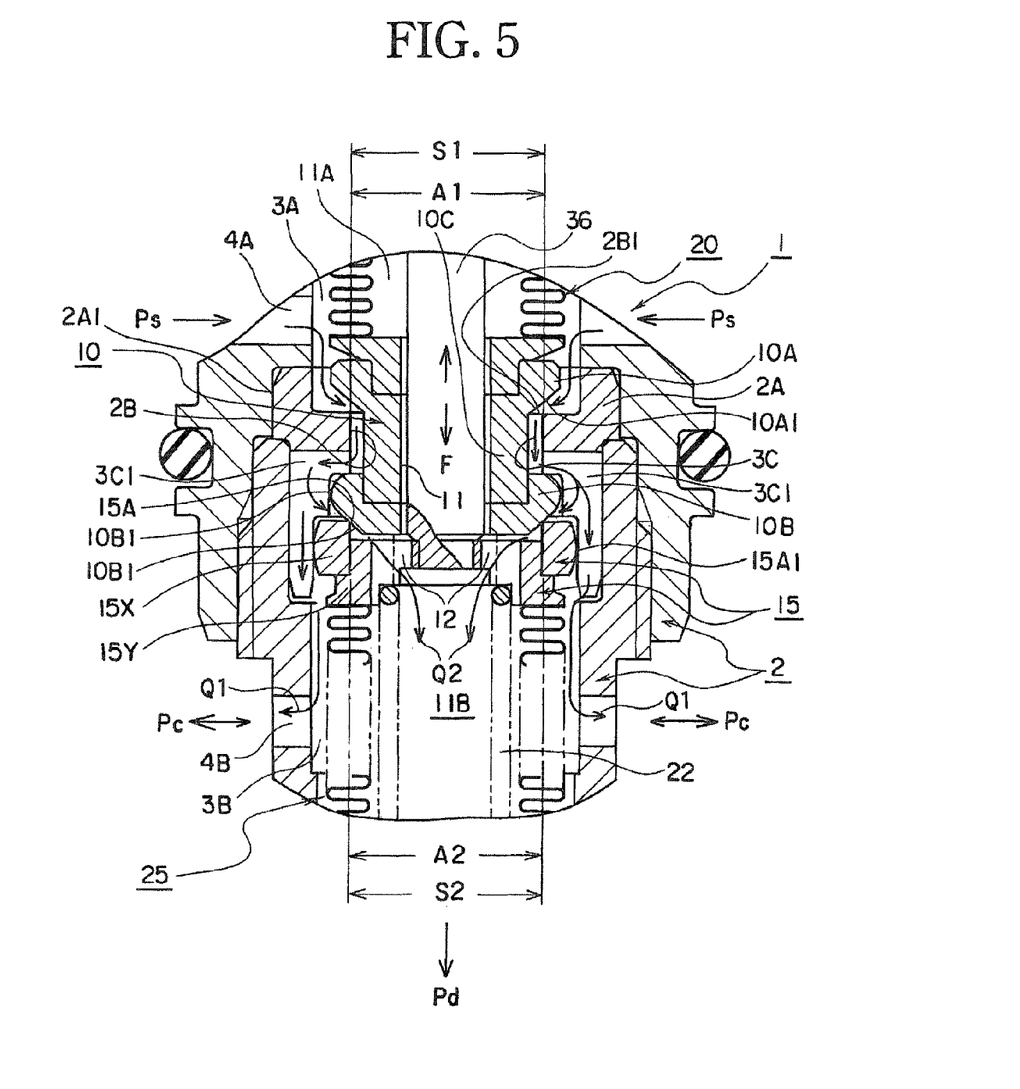
FIG. 5 is a magnified view around the valve portion in FIG. 4.
Figure 6:
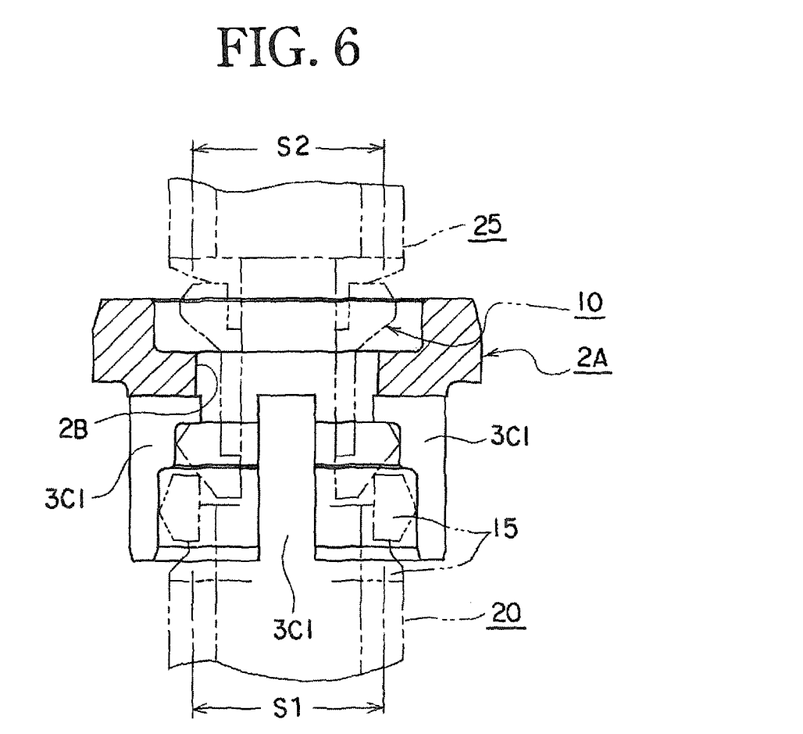
FIG. 6 is a sectional view of components of the partition portion in FIG. 4.
Figure 7:
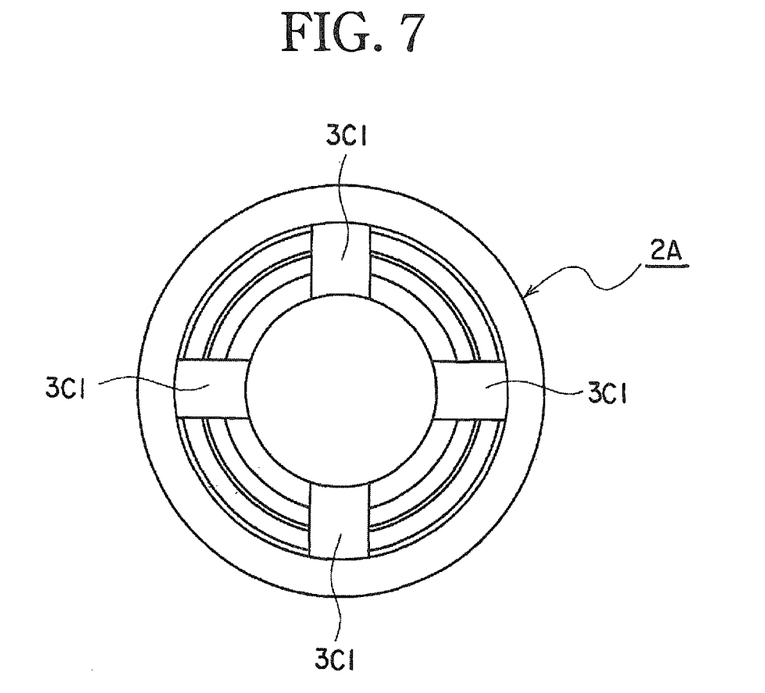
FIG. 7 is a plain view of the partition portion in FIG. 6.

Next, FIG. 4 is a sectional view showing a part of a solenoid portion 1B of a control valve 1 of a second embodiment according to the present invention. Also, FIG. 5 is a magnified view around the valve body 10 of FIG. 4. Further, FIG. 6 is a detailed sectional view of the partition portion 2A of FIG. 5. Further, FIG. 7 is a bottom view of the partition portion 2A shown in FIG. 6. The following description is based on FIG. 4, FIG. 5, FIG. 6 and FIG. 7. A solenoid portion 1B in the control valve 1 is not further explained since it has approximately same constitution as in FIG. 1. Also, a control valve portion 1A of FIG. 4 is modified in a part of components in FIG. 1, but has same constitution as in FIG. 1. Hereinafter, components different from the control valve 1 of FIG. 1 will be explained. As shown in FIG. 4, a third spring 22 is arranged in a second pressure-sensing device 25. The third spring 22 is not always required but is provided for ensuring the elastic-pressing to a valve seat body 15 or for preventing fluctuations when vibrating, etc. Further, the main body 2 is, for convenience of assembly, separated into three parts, i.e. starting from the side of the solenoid portion 1B, a first main body part, a second main body part and a third main body part, each of which is provided with a thread portion in its end portion. Then, corresponding thread portions are screwed in to integrally assembly. The main body 2 is provided with a supply port 4A penetrating a first valve chamber 3A. Also, an output port 4B penetrating a second valve chamber 3B is provided.

A stainless steel partition portion 2A shown in FIG. 4 or FIG. 5 has a configuration as shown in FIG. 6 and FIG. 7. A fit surface 2A1 of an outer circumference of the partition portion 2A is fitted in an inner circumference surface of a valve space chamber 3 in the first main body part of the main body 2. Further, when an external thread of the second main body part is screwed in an internal thread of the first main body part to couple with each other, the partition portion 2A is squeezed to hold and secured therebetween. A valve bore surface 2B is provided in the partition portion 2A. In the upside of the valve bore surface 2B in the figures, a first valve seating surface 2B1 is formed. Further, passage grooves 3C1, 3C1, 3C1 and 3C1 are, as shown in FIG. 7, formed on the opposite side (the lower side in the figures) of the first valve seating surface 2B1 of the partition portion 2A so as to be distributed equally into four in a circumferential direction (where the number is not limited to four but may be more than one). Then, the passage groove 3C1 becomes a fluid passage where a fluid with inlet pressure Ps flows as with a first flow line Q1 when a poppet valve B1 constituted by the first valve seating surface 2B1 and first valve portion surface 10A1 is opened. Also, a first continuous valve bore surface and a second continuous valve bore surface, starting downward in the lower side of the valve bore surface 2B in the figures, are formed so as to have sequentially-increased surrounding surface downward.

Next, the constitution of the valve seat body 15 will be explained. As shown in FIG. 5, the valve seat body 15 is constituted by a ring-shaped first valve seat body 15X and a second valve seat body 15Y having a bottomed cylinder shape. The first valve seat body 15X is formed so as to have an outer circumference surface with a circular arc cross-sectional surface (FIG. 5) or horned cross-sectional surface (FIG. 6). Then, this is loosely fitted to the second continuous valve bore surface of the partition portion 2A so as to provide a small gap. Further, an inner circumference surface of the first valve seat body 15X is formed as a fitting surrounding surface, and an end portion of the fitting surrounding surface at the side of the valve body 10 is formed with a second valve seating surface 15A. Also, in the upside of the second valve seat body 15Y in the figures, a bottom portion is provided, and penetrating second internal passages 12 are provided in the bottom portion so as to be distributed equally into four around a solenoid rod 36 (where the number is not limited to four but may be more than one). Then, as shown with a second flow line Q2 for the fluid with inlet pressure Ps, the passage groove 3C1 can be communicated with the first internal passage 11B in the second pressure-sensing device 25 through the second internal passage 12. Further, the bottom portion of the second valve seat body 15Y is provided with a fitting bore in its axis, and an end portion of the solenoid rod 36 is fitted in the fitting bore to connect with the second valve seat body 15Y. Also, in the second valve seat body 15Y, a spring seat is provided for seating the stainless steel third spring 22. Then, an outer circumference surface at the side of upper end portion of the second valve seat body 15Y is connected and coupled with the fitting surrounding surface of the first valve seat body 15X. Further, a surface of a lower end portion of the second valve seat body 15Y is hermetically and firmly connected with a free end surrounding portion of the second pressure-sensing device 25. Further, the other end surrounding portion of the second pressure-sensing device 25 is hermetically connected with an end portion surface of the third main body part. Then, a first internal passage 11A and the second internal passage 12 in the inner circumference surface of the second pressure-sensing device 25 are communicated with a discharge port 4C as a communication passage in a mass.

The valve body 10 is constituted by the first valve portion 10A and the second valve portion 10B. It is formed by uniting a fuselage portion 10C integrated with the first valve portion 10A with the fitting bore of the second valve portion 10B after inserting it in the valve bore surface 2B of the partition portion 2A. Also, in the valve body 10, the first valve portion 10A provided with a first valve portion surface 10A1 having a tapered surface toward the first pressure-sensing device 20 and a second valve portion surface 10B1 having a tapered surface in the same direction as the second valve portion 10B are formed (opposite direction to that of FIG. 1). Further, an inner surrounding portion of an end portion and an outer circumference mounting portion (a flanged cylindrical portion) of a free end surrounding portion of the first pressure-sensing device 20 are hermetically fitted to the first valve portion 10A to constitute a connecting portion. Then, the solenoid rod 36 passes through a second communication passage 11 provided in the outer circumference mounting portion and the first valve portion 10A and is connected with the bottom portion of the second valve seat body 15. Further, an end portion of the third main body part is coupled with a bleeder 2C by screwing therein. At the center of the bleeder 2C, the discharge port 4C is provided. Also the discharge port 4C is radially provided in the bleeder 2C for discharging the fluid at the side of outer circumference in the second pressure-sensing device 25. Further, a spring seat for the third spring 22 is provided in an upper end portion of the bleeder 2C so as to surround the discharge port 4C. The bleeder 2C can control a force of the third spring by screwing its engaging screw together with an engaging screw of the third main body part.

FIG. 4 and FIG. 5 show, as described above, the same operating condition of the control valve 1 as in FIG. 3. The operating condition of the control valve 1 corresponding to the first embodiment is same as the opening/closing condition shown in FIG. 1 or FIG. 2. However, the valve seat body 15 shown in FIG. 4 and FIG. 5 is mounted to the second pressure-sensing device 25 and arranged in the lower section in the figures unlike the valve seat body 15 of FIG. 3. Further, the valve body 10 is mounted to the first pressure-sensing device 20 and arranged in the upper section in the figures. For these points, FIG. 4 is different from FIG. 3. In the control valve 1 shown in FIG. 4, electric current to the solenoid portion 1B is blocked, or only a small amount of electric current is flowing. In this operating condition, the first poppet valve B1 is opened, and the second poppet B2 is closed. Then, the fluid in the first valve chamber 3A flows through the passage groove 3C1 into the second valve chamber 3B and out to the output port 4B (from the output port 4B further into a control instrument). Further, when electric current flowing into the solenoid portion 1B is increased, the valve seat body 15 is pressed while the second poppet valve B2 is closed, so that the second pressure-sensing device 25 is elastically compressed. Then, the control valve 1 is closed just as in FIG. 1. Under this condition, neither the working fluid in the first valve chamber 3A nor the working fluid in the second valve chamber 3B flow. Namely, the fluid with controlling pressure Pc in a control instrument at the side of the output port 4B is stopped. Further, when electric current flowing into the solenoid portion 1B is largely increased, the first poppet valve B1 is closed, and the movement of the valve body 10 is stopped. On the other hand, the solenoid rod 36 further moves downward in the figures, and the second poppet valve B2 is opened. Then, the second pressure-sensing device 25 is maximally elastically compressed. At this time, opening/closing condition of the valve body 10 is the same as in FIG. 2, and therefore, the fluid flows as with the second flow line Q2 shown in FIG. 5 and is discharged into the discharge port 4C.

In the control valve 1, the first effective pressure receiving area S1 of the first pressure-sensing device 20, the second effective pressure receiving area S2 of the second pressure-sensing device 25, the first pressure receiving area A1 of the first poppet valve B1 and the second pressure receiving area A2 of the second poppet valve B2 are also constituted to have almost same area. Therefore, when the fluid acts on the first poppet valve B1 and the second poppet valve B2, unbalanced forces received from the fluid are canceled each other out.

Note that a relation of the pressure receiving areas is S1=S2=A1=A2, where F is the magnetic force of the solenoid portion 1B. Also, in FIG. 4, the following symbols are the same as in FIG. 3:

S1 is the first effective pressure receiving area of the first pressure-sensing device 20;

S2 is the second effective pressure receiving area of the second pressure-sensing device 25;

A1 is the first pressure receiving area of the inner diameter surface in the first poppet B1 when closing to joint; and A2 is the second pressure receiving area of the inner diameter surface in the second poppet B2 when closing to joint.

When the control valve 1 of the second embodiment is also constituted so as to satisfy the relation of S1=S2=A1=A2, unbalanced forces received from fluid pressure in the control valve 1 are canceled, resulting in the same effects as in the control valve 1 of the first embodiment.

Note that in FIG. 4, it is possible to use the first poppet valve B1 and the second poppet valve B2 as a direction change valve by converting the flow of the fluid with supply pressure Ps, supplied from the supply port 4A, into the first output port (corresponding to the output port of FIG. 4) 4B and the second output port (corresponding to the discharge port of FIG. 4) 4C. Also, as the direction change valve, the fluid can be input from the port (first output port) 4B and output into the port (supply port) 4A and the port (second output port) 4C. In either cases, by constituting to satisfy the relation of S1=S2=A1=A2, as with the control valve 1 of the first embodiment, the control valve of the second embodiment receives no unbalanced forces due to the fluid pressure even when the fluid pressure acts on the first poppet valve B1 and the second poppet valve B2, which enables to change an amount of flow as set up.

Industrial Applicability

As described above, the present invention is useful as a control valve which allows accurately controlling an amount of flow of a fluid supplied to a hydraulic pressure system of an automobile, hydraulic pressure/pneumatic system such as a variety of power transmission devices. Also, the control valve is useful as an inexpensive control valve and further as a control valve without malfunction.

The invention claimed is:

1. A control valve for controlling an amount of flow of a fluid with controlling pressure, comprising:
   a main body having a partition portion dividing an inside of a valve space chamber into a first valve chamber and a second valve chamber, said partition portion being provided with a bore-forming surface for a through-hole penetrating said first valve chamber and said second valve chamber, and said bore-forming surface being provided with a first valve seating surface at a side of the first valve chamber;
   a supply port penetrating into said first valve chamber of said main body and flowing a fluid with supply pressure;
   an output port penetrating into said second valve chamber of said main body and flowing the fluid with controlling pressure;
   a discharge port penetrating into said first valve chamber of said main body and flowing a fluid with discharge pressure;
   a first pressure-sensing spring device
      having an elastically-stretchable cylindrical shape,
      the first pressure-sensing spring device being arranged in said first valve chamber, and
      provided with
         a connecting portion surrounding said discharge port in one end surrounding portion of the first pressure-sensing spring device to connect with the main body and
         a first communication bore in an inner circumference surface of the first pressure-sensing spring device to communicate with said discharge port;
   a valve body
      connected with a free end surrounding portion of said first pressure-sensing spring device in an end portion of the valve body,
      the valve body having
         a second communication bore communicating with said first communication bore provided in the first pressure-sensing spring device, p3 a fuselage portion forming a first flow passage between said bore-forming surface and itself,
         a first valve portion surface comprised of one side of a first poppet valve to open/close said first flow passage by contacting and separating with said first valve seating surface, and
         a second valve portion surface formed on a second valve portion arranged in said second valve chamber at an end of said fuselage portion;
   a valve seat body having
      a second valve seating surface comprised of one side of a second poppet valve to open/close between said second valve chamber and said second communication bore by contacting and separating with said second valve portion surface of said valve body, and
      a second internal through-hole communicatable with said second communication bore;
   a second pressure-sensing spring device
      having an elastically stretchable cylindrical shape,
      the second pressure-sensing spring device being arranged in said second valve chamber to connect with the main body at one end surrounding portion of the second pressure-sensing spring device, and
      provided with a first internal through-hole communicatable with said second internal through-hole in an inner circumference surface of the second pressure-sensing spring device by connecting a free end surrounding portion of the second pressure-sensing spring device with said valve seat body to cover said second internal through-hole on one side; and
   a solenoid portion configured to move a solenoid rod connecting with said valve seat body toward said valve seat body according to a magnitude of electrical current,
   wherein said first valve portion surface and said first valve seating surface constitute said first poppet valve,
   wherein said second valve portion surface and said second valve seating surface constitute said second poppet valve, and
   wherein each pressure receiving area of a first effective pressure receiving area of said first pressure-sensing spring device, a second effective pressure receiving area of said second pressure-sensing spring device, a first pressure receiving area of an inner diameter surface where said first valve seating surface and said first valve portion surface are jointed, and a second pressure receiving area of an inner diameter surface where said second valve seating surface and said second valve portion surface are jointed is made to be substantially equal.

2. The control valve as set forth in claim 1, wherein
   the end portion of said valve body is formed as a stepped fitting portion, and
   the free end surrounding portion of said first pressure-sensing device is hermetically fitted to the stepped fitting portion in the end portion of said valve body.

3. The control valve as set forth in claim 1 or 2, wherein said discharge port provided near a center of said main body, said first communication bore of said first pressure-sensing spring device and said second communication bore provided near an axis of said valve body are substantially aligned.

* * * * *